US012632001B2

(12) United States Patent
Kainuma et al.

(10) Patent No.: US 12,632,001 B2
(45) Date of Patent: May 19, 2026

(54) IMAGE FORMING APPARATUS

(71) Applicant: KYOCERA Document Solutions Inc., Osaka (JP)

(72) Inventors: Takashi Kainuma, Osaka (JP); Kazuhisa Hirahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/926,966

(22) Filed: Oct. 25, 2024

(65) Prior Publication Data

US 2025/0147457 A1 May 8, 2025

(30) Foreign Application Priority Data

Nov. 2, 2023 (JP) ................................ 2023-188688

(51) Int. Cl.
*G03G 15/00* (2006.01)
*G03G 15/01* (2006.01)
*G03G 15/16* (2006.01)

(52) U.S. Cl.
CPC ..... *G03G 15/5058* (2013.01); *G03G 15/0131* (2013.01); *G03G 15/1615* (2013.01); *G03G 15/55* (2013.01)

(58) Field of Classification Search
CPC ........... G03G 15/5054; G03G 15/5058; G03G 15/161; G03G 15/1615; G03G 15/55; G03G 15/553; G03G 15/556; G03G 15/0131; G03G 15/0189
See application file for complete search history.

(56) References Cited

U.S. PATENT DOCUMENTS

2007/0098423 A1* 5/2007 Hirayama .......... G03G 15/0131 399/49
2011/0150541 A1* 6/2011 Michibata ............ G03G 15/161 399/313
2011/0150542 A1* 6/2011 Kim .................. G03G 15/0131 399/313
2013/0322910 A1* 12/2013 Shiga ................... G03G 21/168 399/74
2016/0187829 A1* 6/2016 Ishizaki ............... G03G 15/556 399/49
2017/0075274 A1* 3/2017 Otsuka ............... G03G 15/5058
2018/0095376 A1* 4/2018 Tabata ................. G03G 15/162

FOREIGN PATENT DOCUMENTS

JP 2014-059336 A 4/2014

* cited by examiner

*Primary Examiner* — Carla J Therrien
(74) *Attorney, Agent, or Firm* — Stein IP, LLC

(57) ABSTRACT

An image forming apparatus includes an image forming section, an intermediate transfer belt, and a stretching roller. The intermediate transfer belt has a pair of test regions on opposite sides of a printing region in the width direction, and the image forming section transfers a test pattern image to the test regions. The image forming apparatus further includes an image density sensor and a counter-sensor member having a counter portion facing the image density sensor across the intermediate transfer belt. The edge positions of the counter portion in the width direction are inward, in the width direction, of the edge positions of the stretching roller in the width direction.

6 Claims, 8 Drawing Sheets

IMAGE FORMING APPARATUS

INCORPORATION BY REFERENCE

This application is based on and claims the benefit of priority from Japanese Patent Application No. 2023-188688 filed on Nov. 2, 2023, the contents of which are hereby incorporated by reference. the

BACKGROUND

The present disclosure relates to an image forming apparatus.

An image forming apparatus is provided with an intermediate transfer belt. The intermediate transfer belt rotates while carrying an image formed with toner, to transfer the image to a sheet.

SUMMARY

According to one aspect of the present disclosure, an image forming apparatus includes an image forming section, an intermediate transfer belt, which is endless, and a stretching roller. The image forming section forms an image with toner. The intermediate transfer belt rotates while carrying on its outer circumferential surface the image transferred from the image forming section. The stretching roller is rotatable about an axis extending in the width direction orthogonal to the rotation direction of the intermediate transfer belt, and is disposed inward, in the width direction, of the edges of the intermediate transfer belt in the width direction. The stretching roller has the intermediate transfer belt stretched on it by making contact with the inner circumferential surface of the intermediate transfer belt. The intermediate transfer belt has a printing region inward, in the width direction, of the edges of the stretching roller in the width direction, and has as a test region at least one of a pair of regions on both sides of the printing region in the width direction. The image forming section transfers to the printing region a print image to be printed on a sheet, and transfers to the test region a test pattern image for calibration with respect to image formation by the image forming section. The image forming apparatus further includes an image density sensor and a counter-sensor member. The image density sensor is disposed at a distance from the outer circumferential surface of the intermediate transfer belt, and shines light to the test region to output a value corresponding to the amount of light reflected from the test region. The counter-sensor member makes contact with the inner circumferential surface of the intermediate transfer belt, and has a counter portion facing the image density sensor across the intermediate transfer belt. The edge positions of the counter portion in the width direction are inward, in the width direction, of the edge positions of the stretching roller in the width direction or are the same as the edge positions of the stretching roller in the width direction.

DETAILED DESCRIPTION

One embodiment of the present disclosure will be described below taking as an example a tandem-type color laser printer. The present disclosure is applicable not only to printers but also to multifunction peripherals furnished with a copying function and the like.

Figure 1:
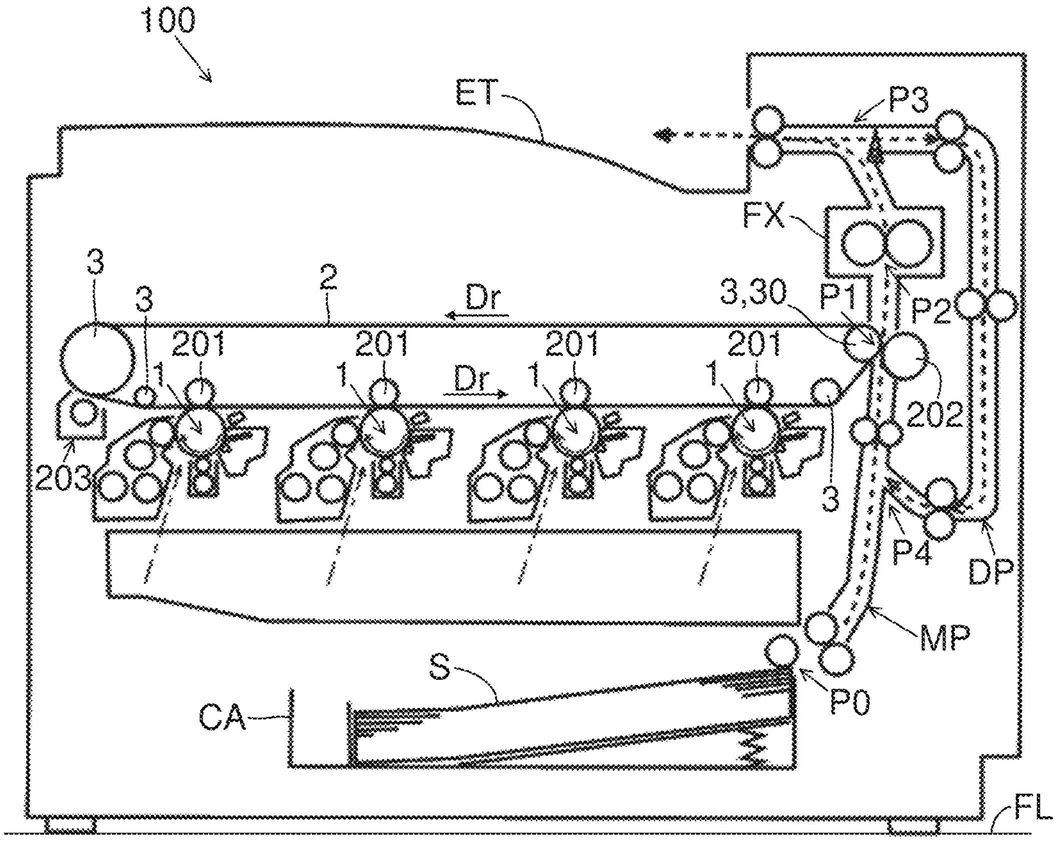
FIG. 1 is a schematic diagram of an image forming apparatus according to an embodiment.

Construction of an Image Forming Apparatus: FIG. 1 shows the construction of an image forming apparatus 100 according to the embodiment. The image forming apparatus 100 is installed on a flat floor surface FL. The top-bottom direction of the image forming apparatus 100 is perpendicular to the floor surface FL.

The image forming apparatus 100 includes a main conveyance passage MP. The image forming apparatus 100 also includes a sheet cassette CA. The sheet cassette CA is removably mounted in the body of the image forming apparatus 100. The sheet cassette CA stores sheets S to be used in a print job. The main conveyance passage MP leads from a feed position P0, at which a sheet S is fed into it from the sheet cassette CA, via a transfer position P1 and a fixing position P2 to a discharge tray ET.

In a print job, a sheet S in the sheet cassette CA is fed, at the feed position P0, into the main conveyance passage MP. The sheet S is conveyed along the main conveyance passage MP. Meanwhile, an image is formed with toner. The image is then printed on the sheet S being conveyed. In other words, the transferring of the image to the sheet S being conveyed is carried out at the transfer position P1. At the fixing position P2, the fixing of the image to the sheet S is carried out.

The image forming apparatus 100 includes an image forming section 1, and here specifically includes four image forming sections 1. The four image forming sections 1 correspond to different colors, specifically cyan, magenta, yellow, and black respectively. The four image forming sections 1 form images using toner of the corresponding colors respectively. The four image forming sections 1 are configured similarly and accordingly the following description focuses on one particular image forming section 1; for the other image forming sections 1 the following description is to be referred to and no separate description will be given.

Figure 2:
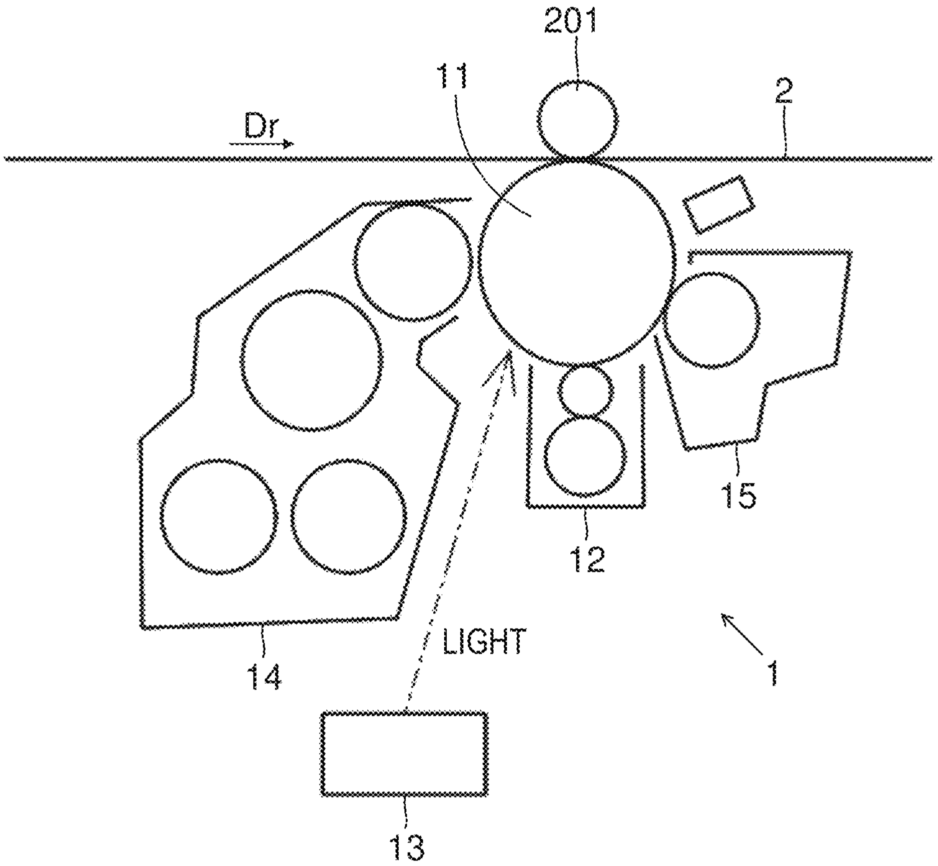
FIG. 2 is a schematic diagram of an image forming section according to the embodiment.

As shown in FIG. 2, the image forming section 1 includes a photosensitive drum 11, a charging device 12, an exposure device 13, a developing device 14, and a cleaning device 15. During image formation by the image forming section 1, the photosensitive drum 11 rotates. The charging device 12 electrostatically charges the outer circumferential surface of the photosensitive drum 11. The exposure device 13 exposes to light the outer circumferential surface of the photosensitive drum 11 to form an electrostatic latent image on the outer circumferential surface of the photosensitive drum 11. The developing device 14 feeds toner to the outer circumferential surface of the photosensitive drum 11 to develop the electrostatic latent image into a toner image. The toner image on the outer circumferential surface of the photosensitive drum 11 is primarily transferred to an intermediate transfer belt 2, which will be described later. The cleaning device 15 removes the toner that remains on the outer circumferential surface of the photosensitive drum 11 without being transferred to the intermediate transfer belt 2.

As shown in FIG. 1, the image forming apparatus 100 includes an intermediate transfer belt 2. The intermediate transfer belt 2 is an endless belt. The intermediate transfer belt 2 is rotatably supported. The intermediate transfer belt 2 is one component of an intermediate transfer unit.

In the following description, the rotation direction of the intermediate transfer belt 2 is referred to as the belt rotation direction and is identified by the reference sign "Dr." The width direction of the intermediate transfer belt 2 is referred to as the belt width direction and is identified by the reference sign "Dw." The belt width direction Dw is orthogonal to the belt rotation direction Dr and is orthogonal to the top-bottom direction (i.e., it is a horizontal direction). The belt width direction Dw corresponds to the main scanning direction and the belt rotation direction Dr corresponds to the sub (subsidiary) scanning direction. In FIGS. 1 and 2, the belt width direction Dw is perpendicular to the plane of the figure.

The intermediate transfer belt 2 includes a base layer and a rubber layer (i.e., elastic layer) on top of the base layer. The base layer can be formed of a material having electrical conductivity obtained by mixing polyimide or PVDF (polyvinylidene fluoride) with a electrically conductive material such as an ionic conductive material or a conductive carbon. The rubber layer can be formed of hydrin rubber, chloroprene rubber, or polyurethane rubber. The rubber layer can be protected with a coat layer on top of it. The coat layer can be formed of acrylic resin, silicone, or fluororesin.

The image forming apparatus 100 includes, as one component of the intermediate transfer unit, a stretching roller 3. The stretching roller 3 is supported so as to be rotatable about an axis extending in the belt width direction Dw. Specifically, the stretching roller 3 is fitted on a rotary shaft 300 (see FIG. 3) that is rotatable about an axis extending in the belt width direction Dw. The stretching roller 3 rotates together with the rotary shaft 300.

The stretching roller 3 is disposed in a space at the inner circumference side of the intermediate transfer belt 2. The space at the inner circumference side of the intermediate transfer belt 2 is a space surrounded by the inner circumferential surface of the intermediate transfer belt 2, and is a space inside an annular member constituted by the intermediate transfer belt 2. The stretching roller 3 makes contact with the inner circumferential surface of the intermediate transfer belt 2. The stretching roller 3 rotatably stretches the intermediate transfer belt 2. To rotatably stretch the intermediate transfer belt 2, a plurality of stretching rollers 3 are disposed in the space at the inner circumference side of the intermediate transfer belt 2. Depending on the size of the intermediate transfer belt 2 and the like, the number of stretching rollers 3 is adjusted as necessary.

Figure 3:
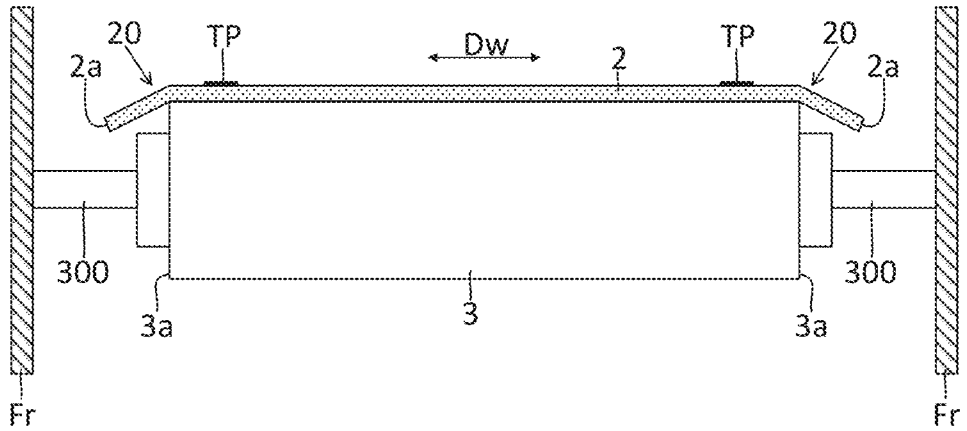
FIG. 3 is a diagram schematically showing a stretching roller with its surroundings according to the embodiment.

As shown in FIG. 3, the stretching roller 3 is disposed inward of the edges 2*a* of the intermediate transfer belt 2 in the belt width direction Dw. FIG. 3 shows the stretching roller 3 with its surroundings on a section across a plane parallel to the belt width direction Dw. FIG. 3 only schematically shows the stretching roller 3 with its surroundings and does not exactly reflect the actual dimensions, shapes, and the like.

Of the stretching roller 3, the edge 3*a* at one side in the belt width direction Dw (i.e., the axial direction of the stretching roller 3) is located inward, in the belt width direction Dw, of the edge 2*a* of the intermediate transfer belt 2 at one side in the belt width direction Dw, and the edge 3*a* at the other side in the belt width direction Dw is located inward, in the belt width direction Dw, of the edge 2*a* of the intermediate transfer belt 2 at the other side in the belt width direction Dw.

In this construction, the stretching roller 3 makes contact with the inner circumferential surface of the intermediate transfer belt 2 inward of the opposite edges 2*a* of the intermediate transfer belt 2 in the belt width direction Dw. The edge of the intermediate transfer belt 2 at one side in the belt width direction Dw lies outward, in the belt width direction Dw, beyond the edge of the stretching roller 3 at one side in the belt width direction Dw. The edge of the intermediate transfer belt 2 at the other side in the belt width direction Dw lies outward, in the belt width direction Dw, beyond the edge of the stretching roller 3 at the other side in the belt width direction Dw.

Figure 4:
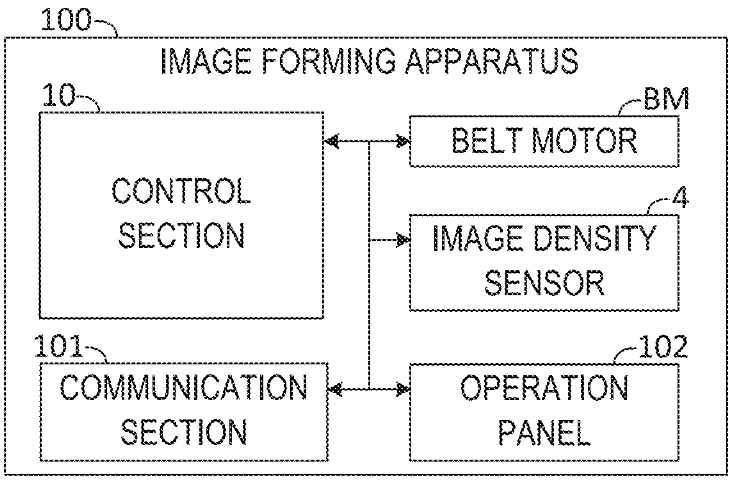
FIG. 4 is a block diagram of the image forming apparatus according to the embodiment.

One of the plurality of stretching rollers 3 is coupled to a belt motor BM (see FIG. 4). In the following description, the stretching roller 3 coupled to the belt motor BM is referred to as the driving roller and is identified by the reference sign "30." The driving roller 30 rotates by being fed with a driving force from the belt motor BM. As the driving roller 30 rotates, the intermediate transfer belt 2 rotates by following it. The other stretching rollers 3 rotate by following the intermediate transfer belt 2.

The image forming apparatus 100 includes, as one component of the intermediate transfer unit, a pair of unit frames Fr. The pair of unit frames Fr are disposed to face each other in the belt width direction Dw across the intermediate transfer belt 2. The one and the other end of the rotary shaft 300 on which the stretching roller 3 is fitted are rotatably supported on the pair of unit frames Fr respectively.

The image forming apparatus 100 includes, as one component of the intermediate transfer unit, a primary transfer roller 201, and here specifically includes four primary transfer rollers 201. The primary transfer rollers 201 are assigned one for each of the different colors of cyan, magenta, yellow, and black. Each primary transfer roller 201 is disposed in the space at the inner circumference side of the intermediate transfer belt 2 and is supported so as to be rotatable about an axis extending in the belt width direction Dw. Each primary transfer roller 201 is disposed to face, across the intermediate transfer belt 2, the photosensitive drum 11 that carries the image of the corresponding color. Each primary transfer roller 201 grips the intermediate transfer belt 2 against the photosensitive drum 11 that carries the image of the corresponding color.

The image forming apparatus 100 also includes a secondary transfer roller 202. The secondary transfer roller 202 is supported so as to be rotatable about an axis extending in the belt width direction Dw. The secondary transfer roller 202 lies in pressed contact with the outer circumferential surface of the intermediate transfer belt 2 at the transfer position P1. The secondary transfer roller 202 grips the intermediate transfer belt 2 against the driving roller 30 to form a transfer nip with the intermediate transfer belt 2. Thus the transfer nip is formed at the transfer position P1. The main conveyance passage MP passes through the transfer nip.

In a print job, a sheet S is conveyed toward the transfer position P1 (i.e., the transfer nip). The sheet S being conveyed passes through the transfer nip. Thus the intermediate transfer belt 2 makes contact with the sheet S being conveyed downstream, in the belt rotation direction Dr, of the positions of contact with the photosensitive drums 11.

The image forming sections 1 form images with toner of the corresponding colors. The primary transfer rollers 201 primarily transfer those images to the outer circumferential surface of the intermediate transfer belt 2.

The intermediate transfer belt 2 rotates while carrying on its outer circumferential surface the images primarily transferred from the photosensitive drums 11. While the sheet S is passing through the transfer nip, the sheet S makes contact with the outer circumferential surface of the intermediate transfer belt 2. The secondary transfer roller 202 is fed with a transfer voltage from a transfer voltage power supply (not illustrated). The secondary transfer roller 202 forms a transfer electric field between itself and the intermediate transfer belt 2 to secondarily transfer the images to the sheet S passing through the transfer nip.

The image forming apparatus 100 incudes a cleaning section 203. The cleaning section 203 faces the outer circumferential surface of the intermediate transfer belt 2 downstream of the transfer position P1 in the belt rotation direction Dr. The cleaning section 203 cleans the outer circumferential surface of the intermediate transfer belt 2.

The image forming apparatus 100 includes a fixing section FX. The fixing section FX includes a heating roller and a pressing roller. The fixing section FX is disposed at the fixing position P2. The heating roller incorporates a heater. The pressing roller lies in pressed contact with the heating roller. The heating roller and the pressing roller are kept in pressed contact with each other to form a fixing nip at the fixing position P2.

In a print job, a sheet S passes at the fixing position P2. That is, the sheet S is gripped in the fixing nip. The fixing section FX heats the sheet S passing at the fixing position P2. At the fixing position P2, the sheet S is pressed. The fixing section FX heats and presses the sheet S to fix the toner image to the sheet S. The sheet S having undergone fixing is discharged into a discharge tray ET.

The image forming apparatus 100 includes a conveyance section, though with no reference sign assigned to it. The conveyance section includes paired conveyance rollers. The paired conveyance rollers include a pair of rollers. The pair of rollers has a conveyance nip between the rollers. The paired conveyance rollers rotate and thereby convey a sheet S that has entered the conveyance nip. The conveyance section conveys the sheet S along the main conveyance passage MP. The conveyance section conveys the sheet S also along a duplex printing conveyance passage DP, which will be described later.

The image forming apparatus 100 can perform a simplex printing job, in which an image is printed only on one side of a sheet S, or a duplex printing job, in which images are printed on both sides of a sheet S. For duplex printing jobs, the image forming apparatus 100 includes a duplex printing conveyance passage DP.

The duplex printing conveyance passage DP branches off the main conveyance passage MP at a branch position P3 on it downstream of the intermediate transfer belt 2 in the sheet conveyance direction. The duplex printing conveyance passage DP joins the main conveyance passage MP back at a junction position P4 on it upstream of the transfer position P1 in the sheet conveyance direction.

If the job being performed is a simplex printing job, the sheet S passes through the transfer nip only once and the sheet S passing through the transfer nip undergoes image transfer only once. Having undergone the first-time image transfer the sheet S is as it is discharged into the discharge tray ET.

If the job being performed is a duplex printing job, the sheet S has to undergo image transfer once for each of its obverse and reverse sides and thus the sheet S passes through the transfer nip twice. Specifically, when the sheet S passes through the transfer nip for the first time, it undergoes image transfer on one side. After the first-time image transfer, after the trailing end of the sheet S has left the branch position P3, before the sheet S is completely discharged into the discharge tray ET, the sheet S is switched back. The sheet S is then, starting at its trailing end, pulled into the duplex printing conveyance passage DP.

The sheet S is then conveyed along the duplex printing conveyance passage DP. The sheet S in the duplex printing conveyance passage DP is then returned, at the junction position P4, into the main conveyance passage MP. The sheet S having returned to the main conveyance passage MP is conveyed along the main conveyance passage MP and passes through the transfer nip again. This time, the sheet S has its obverse and reverse sides reversed compared with when it passed through the transfer nip last time. Thus, when the sheet S passes through the transfer nip for the second time, it undergoes image transfer on its other side opposite from its one side.

As shown in FIG. 4, the image forming apparatus 100 includes a control section 10. The control section 10 includes processing circuits such as a CPU and an ASIC. The control section 10 also includes storage devices such as a ROM and a RAM. The control section 10 controls print jobs performed on the image forming apparatus 100. The control section 10 controls the belt motor BM to rotate the intermediate transfer belt 2 appropriately.

The image forming apparatus 100 includes a communication section 101. The communication section 101 includes a communication circuit, a communication memory, a communication connector, and the like. The communication section 101 is connected to, so as to be able to communicate with, an external device across a network such as a LAN. The external device can be a user terminal. The user terminal can be a personal computer (PC), a smartphone, a tablet computer, or the like.

Via the communication section 101 the control section 10 communicates with the external device. For example, the external device (user terminal) transmits print data for a print job to the image forming apparatus 100. The print data contains, among others, the data of an image to be printed in a print job. Based on the print data the control section 10 controls the print job.

The image forming apparatus 100 includes an operation panel 102. The operation panel 102 includes a touch screen. The operation panel 102 accepts settings and instructions from a user. The operation panel 102 is connected to the control section 10. The control section 10 recognizes the settings and instructions that the operation panel 102 has accepted from the user.

The image forming apparatus 100 includes an image density sensor 4. The image density sensor 4 is used to sense the density and position of the image transferred to the outer circumferential surface of the intermediate transfer belt 2. The image density sensor 4 is connected to the control section 10. The control section 10 is fed with the output value of the image density sensor 4.

The image density sensor 4 is disposed at a distance from the outer circumferential surface of the intermediate transfer belt 2. The image density sensor 4 is a reflection optical sensor and has a light-emitting segment and a light-receiving segment. The image density sensor 4 shines light to the outer circumferential surface of the intermediate transfer belt 2 and outputs a value corresponding to the amount of light reflected from the outer circumferential surface (specifically, a test region 22, which will be described later) of the intermediate transfer belt 2. The image density sensor 4 varies its output value according to whether an image is present at its sensing position or not. The image density sensor 4 varies its output value also according to the density of the image present at its sensing position. The sensing position of the image density sensor 4 is a position on the intermediate transfer belt 2 that faces the image density sensor 4 and to which the image density sensor 4 shines light.

Figure 5:
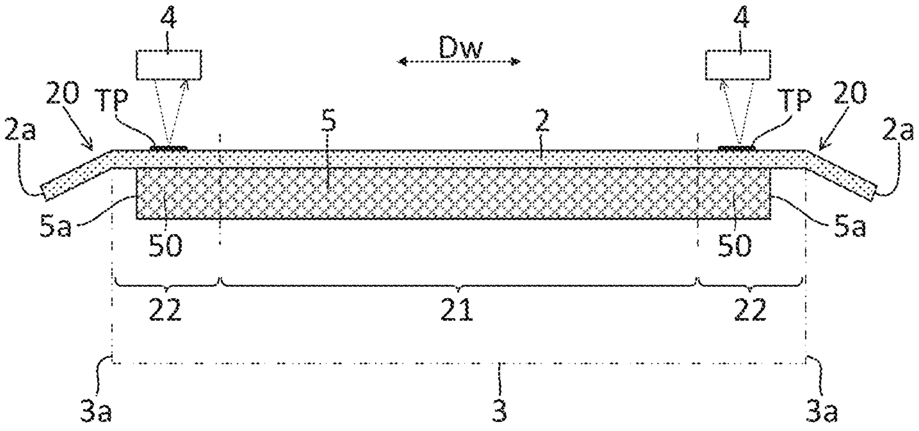
FIG. 5 diagram schematically showing a counter-sensor member with its surroundings according to the embodiment.

Here, as shown in FIG. 5, the image forming apparatus 100 includes a counter-sensor member 5. The counter-sensor member 5 is disposed at the inner circumference side of the intermediate transfer belt 2. The counter-sensor member 5 lies in contact with the inner circumferential surface of the intermediate transfer belt 2. The counter-sensor member 5 suppresses, from the space at the inner circumference side of the intermediate transfer belt 2, its deformation at the sensing position of the image density sensor 4. In FIG. 5, a stretching roller 3 is indicated by dash-dot-dot lines. In FIG. 5, the light emitted from the image density sensor 4 (and its reflection) is indicated by broken-line arrows. This applies also to FIG. 8, which will be referred to later.

Figure 6:
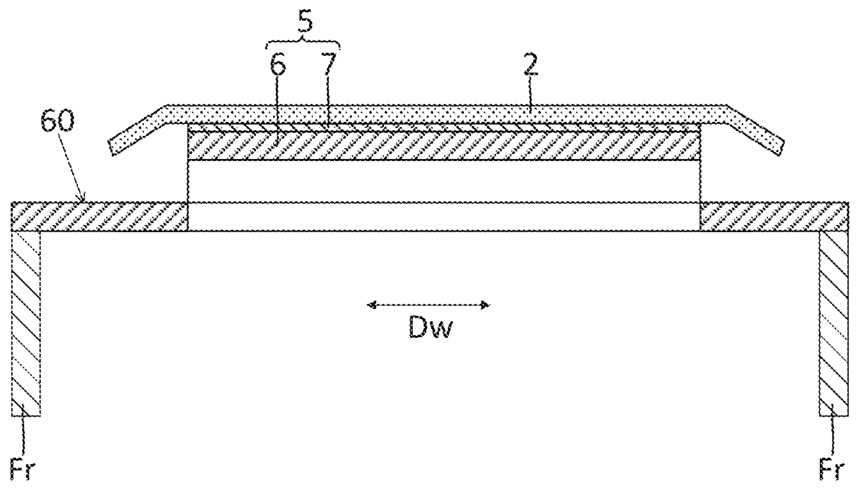
FIG. 6 is a diagram schematically showing the counter-sensor member according to the embodiment.

The counter-sensor member 5 has a structure as shown in FIG. 6. Specifically, the counter-sensor member 5 has a base member 6 and a sheet member 7.

The counter-sensor member 5 is part of a sheet-metal member 60. The sheet-metal member 60 is stretched from one to the other of the pair of unit frames Fr. The sheet-metal member 60 is disposed at the inner circumference side of the intermediate transfer belt 2. The sheet-metal member 60 has a part of it, as its base member 6, molded so as to protrude substantially in a rectangular shape toward the inner circumferential surface of the intermediate transfer belt 2. That is, part of the sheet-metal member 60 functions as the base member 6. The base member 6 has its longitudinal direction aligned with the belt width direction Dw.

The sheet member 7 is disposed on the surface of the base member 6 facing the inner circumferential surface of the intermediate transfer belt 2. That is, the sheet member 7 is disposed between the inner circumferential surface of the intermediate transfer belt 2 and the base member 6. Thus the sheet member 7 lies in contact with the inner circumferential surface of the intermediate transfer belt 2. The sheet-metal member 60, including the base member 6, lies out of contact with the intermediate transfer belt 2. The sheet member 7 can be bonded to the base member 6.

As shown in FIG. 5, the counter-sensor member 5 has a part of it disposed to face the image density sensor 4 across the intermediate transfer belt 2. That is, the counter-sensor member 5 has a counter portion 50 that faces the image density sensor 4 across the intermediate transfer belt 2.

FIGS. 5 and 6 shows the counter-sensor member 5 with its surroundings in a section across a plane parallel to the belt width direction Dw. FIGS. 5 and 6 only schematically show the counter-sensor member 5 with its surroundings and does not exactly reflect the actual dimensions, shapes, and the like. This applies also to FIG. 8, which will be referred to later.

Owing to the provision of the counter-sensor member 5, the intermediate transfer belt 2 is, at the sensing position of the image density sensor 4, supported by the counter portion 50. This helps suppress deformation, such as sagging, of the intermediate transfer belt 2 at the sensing position of the image density sensor 4.

The image density sensor 4 is used in calibration, which will be described later. For accurate calibration the sensing by the image density sensor 4 has to be accurate. It is therefore preferable to suppress deformation of the intermediate transfer belt 2 at the sensing position of the image density sensor 4.

Outline of Calibration: The control section 10 performs calibration to maintain a certain level of quality in the output image. In calibration the control section 10 corrects density and color displacements in the output image. To that end the control section 10 senses, based on the output value of the image density sensor 4, the density of the image transferred to the outer circumferential surface of the intermediate transfer belt 2; the control section 10 also senses, based on the output value of the image density sensor 4, the position (in other words, displacement) of the image transferred to the outer circumferential surface of the intermediate transfer belt 2.

For calibration the control section 10 makes each image forming section 1 form a test pattern image TP for use in calibration. The test pattern image TP is not printed on a sheet S. The test pattern image TP can comprise, for example, an image for use in density correction and an image for use in color displacement correction. In the diagrams, test pattern images TP are indicated as solid black regions.

For density correction the control section 10 makes each image forming section 1 form a test pattern image TP for use in density correction. For example, the image forming section 1 forms, as the test pattern image TP for use in density correction, a plurality of patches with varying densities and transfers these to the intermediate transfer belt 2. Based on the output value of the image density sensor 4 the control section 10 acquires a plurality of patch densities for different colors. If an acquired density is lower than the target density, the control section 10 makes such a correction as to increase the density of the print image; if an acquired density is higher than the target density, the control section 10 makes such a correction as to reduce the density of the print image. For density correction, a developing bias or a transferring bias can be corrected.

For color displacement correction the control section 10 makes each image forming section 1 form a test pattern image TP for use in color displacement correction. For example, the image forming section 1 forms, as the test pattern image TP for use in color displacement correction in the main scanning direction, lines inclined at 45° relative to the main scanning direction and transfer them to the intermediate transfer belt 2. Likewise, the image forming section 1 forms, as the test pattern image TP for use in color displacement correction in the sub scanning direction, lines parallel to the main scanning direction and transfer them to the intermediate transfer belt 2. Based on the output value of the image density sensor 4 the control section 10 senses the intervals between the lines of different colors. The control section 10 corrects the exposure start position so as to make the intervals between the lines of different colors equal to a target interval.

Figure 7:
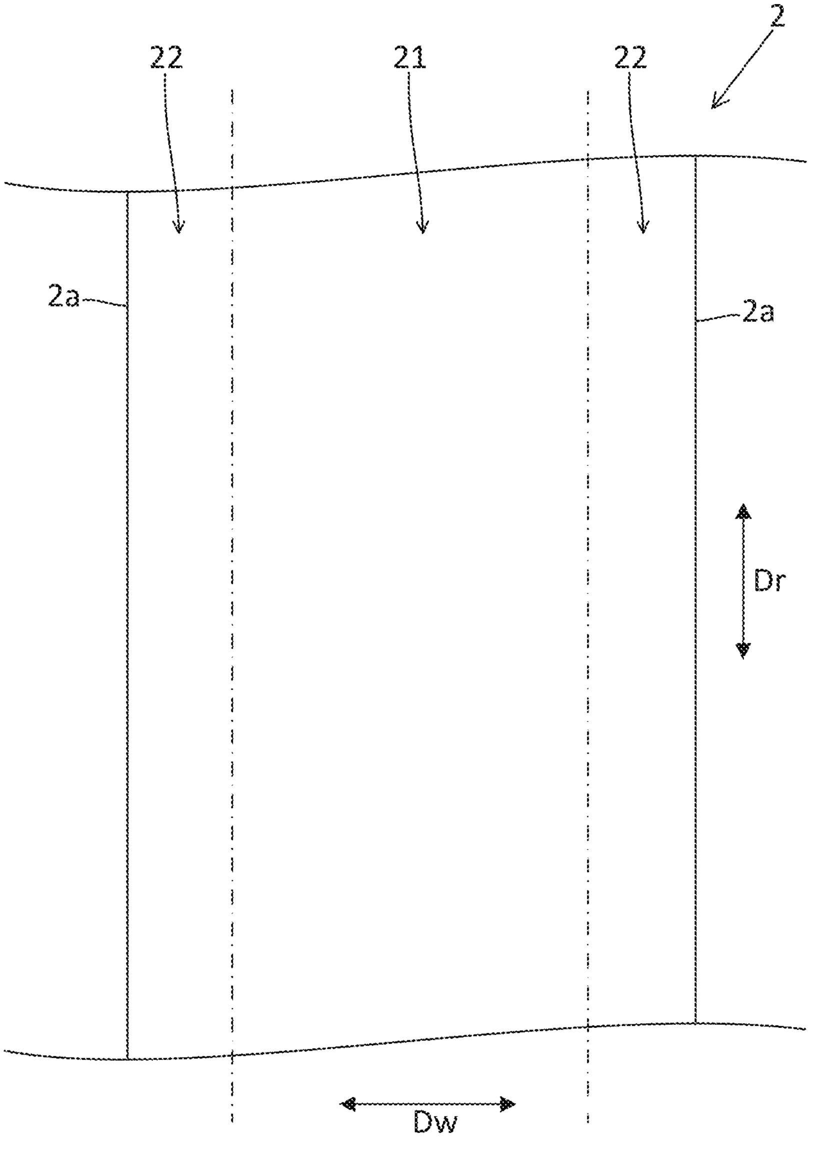
FIG. 7 is a diagram showing the positions of a printing region of test regions according to the embodiment.

Regions for Formation of Test Pattern Images: As shown in FIGS. 5 and 7, the intermediate transfer belt 2 has a printing region 21 and a test region 22. In other words, the outer circumferential surface of the intermediate transfer belt 2 divides into a printing region 21 and a test region 22. In FIGS. 5 and 7, for clear distinction between the printing region 21 and the test region 22, the boundaries between them are indicated by dash-and-dot lines. FIG. 7 is a plan view of the intermediate transfer belt 2 as seen in its thickness direction.

The intermediate transfer belt 2 has the printing region 21 inward, in the belt width direction Dw, of the edges 3*a* of the stretching roller 3 in the belt width direction Dw. The intermediate transfer belt 2 has, as the test region 22, at least one of a pair of regions on opposite sides of the printing region 21 in the belt width direction Dw. For example, the intermediate transfer belt 2 has, as the test region 22, both one and the other of the pair of regions on opposite sides of the printing region 21 in the belt width direction Dw. In this configuration, the regions on both sides of the printing region 21 in the belt width direction Dw constitute the test region 22.

The image forming section 1 transfers to the printing region 21 a print image to be printed on the sheet S. Each image forming section 1 transfers the test pattern image TP in the test region 22. Thus calibration can be performed concurrently with a print job without inviting a drop in productivity. In a case where calibration alone is performed, the test pattern image TP can be transferred not only to the test region 22 but also to the printing region 21.

Edge Positions of the Couter-Sensor Member: The image density sensor 4 shines light to the outer circumferential surface of the intermediate transfer belt 2. The light reflected from the outer circumferential surface of the intermediate transfer belt 2 (the light thus conveys the image on the outer circumferential surface of the intermediate transfer belt 2) strikes the image density sensor 4. This achieves the sensing of the density and position of the image transferred to the outer circumferential surface of the intermediate transfer belt 2.

Here, in a construction where the intermediate transfer belt 2 is stretched on the stretching roller 3, the part of the intermediate transfer belt 2 in contact with the stretching roller 3 is pressed from the inner circumference side to the outer circumference side of the intermediate transfer belt 2. This leaves the part of the intermediate transfer belt 2 in contact with the stretching roller 3 protruding from the inner circumference side to the outer circumference side of the intermediate transfer belt 2 relative to edge parts of the intermediate transfer belt 2 in the belt width direction Dw (see FIGS. 3 and 5). In other words, the intermediate transfer belt 2 is bent starting at the boundaries between its parts in contact with and out of contact with the stretching roller 3 in the belt width direction Dw (i.e., starting at where the intermediate transfer belt 2 overlaps with the edges 3*a* of the stretching roller 3 in the belt width direction Dw). In yet other words, the parts of the intermediate transfer belt 2 outward, in the belt width direction Dw, of the edges 3*a* of the stretching roller 3 in the belt width direction Dw are bent to the inner circumference side of the intermediate transfer belt 2. In the following description, a boundary between parts of the intermediate transfer belt 2 in contact with and out of contact with the stretching roller 3 is identified by the reference sign "20" and is referred to as the bent belt parts 20.

Figure 8:
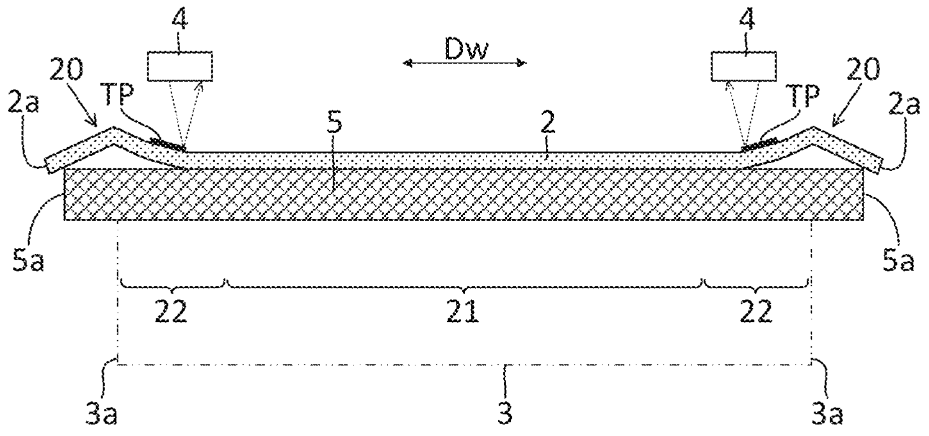
FIG. 8 is a diagram illustrating the inconvenience resulting from the edges of the counter-sensor member being located outward of the edges of the stretching roller.

If a bent belt portion 20 runs on the counter-sensor member 5, as shown in FIG. 8, the positional relationship between the image density sensor 4 and the test region 22 changes. Specifically, the distance between the image density sensor 4 and the test region 22 changes. Moreover, the test region 22 becomes greatly inclined relative to the light exit surface of the image density sensor 4 (i.e., the angle of the former relative to the latter changes). These changes in distance and angle between the image density sensor 4 and the test region 22 make difficult accurate sensing of the density and position of the transferred test pattern image TP.

To avoid that, in the embodiment, as shown in FIG. 5, the counter-sensor member 5 is disposed at a position where the bent belt portion 20 will not run on it. Specifically, the edge positions of the counters parts 50 of the counter-sensor member 5 in the belt width direction Dw are located inward, in the belt width direction Dw, of the edge positions of the stretching roller 3 in the belt width direction Dw. Of the counter-sensor member 5, the edge 5*a* of the counter portion 50 at one side in the belt width direction Dw is located inward of the edge 3*a* of the stretching roller 3 at one side in the belt width direction Dw, and the edge 5*a* of the counter portion 50 at the other side in the belt width direction Dw is located inward of the edge 3*a* of the stretching roller 3 at the other side in the belt width direction Dw.

If as shown in FIG. 8 the edges 5*a* of the counter-sensor member 5 are located outward, in the belt width direction Dw, of the edges 3*a* of the stretching roller 3, the bent belt portion 20 runs on the counter-sensor member 5 and the distance and the angle between the intermediate transfer belt 2 and the image density sensor 4 change. By contrast, if as shown in FIG. 5 the edges 5*a* of the counter-sensor member 5 are located inward, in the belt width direction Dw, of the edges 3*a* of the stretching roller 3, the bent belt portion 20 does not run on the counter-sensor member 5. This helps suppress deformation of the intermediate transfer belt 2 at the sensing position of the image density sensor 4 (i.e., the test region 22).

Thus, while in this embodiment the regions of the intermediate transfer belt 2 on both sides of the printing region 21 in the belt width direction Dw constitute the test region 22, it is even then possible to suppress changes in the distance and the angle between the intermediate transfer belt 2 and the image density sensor 4 and to achieve accurate sensing with the image density sensor 4. It is thus possible to accurately perform calibration with respect to image formation without inviting a drop in productivity.

In the embodiment, the edge positions of the counter-sensor member 5 in the belt width direction Dw are located inward, in the belt width direction Dw, of the edge positions of the stretching roller 3 in the belt width direction Dw but outward, in the belt width direction Dw, of the edge positions of the printing region 21 in the belt width direction Dw. This makes it easy to arrange the image density sensor 4, which has its sensing position in the test region 22, and the counter-sensor member 5 such that these face each other across the intermediate transfer belt 2.

In the embodiment, each image forming section 1 transfers the test pattern image TP to a region of the test region 22 that overlaps with the counter portion 50 of the counter-sensor member 5. It is thus possible to accurately sense the density and position of the transferred test pattern image TP.

As a modified example, though not illustrated, the edge positions of the counter-sensor member 5 in the belt width direction Dw can be, with respect to the belt width direction Dw, the same as the edge positions of the stretching roller 3 in the belt width direction Dw. Also with the configuration of this modified example, it is possible to suppress changes in the distance and the angle between the intermediate transfer belt 2 and the image density sensor 4 and achieve accurate sensing with the image density sensor 4.

In the embodiment, the sheet member 7 has a lower friction coefficient than the base member 6 against the inner circumferential surface of the intermediate transfer belt 2. It is thus possible to reduce resistance to the rotation of the intermediate transfer belt 2. The sheet member 7 is, for example, a nonwoven fabric.

In the embodiment, the sheet member 7 is electrically conductive. That is, the sheet member 7 is a conductive nonwoven fabric. It is thus possible to drain static electricity on the intermediate transfer belt 2.

The embodiment disclosed herein should be understood to be in every sense illustrative and not restrictive. The scope of the present disclosure is defined not by the description of the embodiment given above but by the appended claims and encompasses any modifications made within a scope equivalent in significance to those claims.

What is claimed is:

1. An image forming apparatus comprising:

an image forming section that forms an image with toner;

an intermediate transfer belt that is endless and that rotates while carrying on an outer circumferential surface thereof the image transferred from the image forming section, and a stretching roller that is rotatable about an axis extending in a width direction orthogonal to a rotation direction of the intermediate transfer belt, the stretching roller being disposed inward, in the width direction, of edges of the intermediate transfer belt in the width direction, the stretching roller having the intermediate transfer belt stretched thereon by making contact with an inner circumferential surface of the intermediate transfer belt, wherein the intermediate transfer belt has a printing region inward, in the width direction, of edges of the stretching roller in the width direction and has as a test region at least one of a pair of regions on both sides of the printing region in the width direction, the image forming section transfers to the printing region a print image to be printed on a sheet and transfers to the test region a test pattern image for calibration with respect to image formation by the image forming section, the image forming apparatus further comprises:

an image density sensor that is disposed at a distance from an outer circumferential surface of the intermediate transfer belt, the image density sensor shining light to the test region to output a value corresponding to an amount of light reflected from the test region; and a counter-sensor member that makes contact with the inner circumferential surface of the intermediate transfer belt, the counter-sensor member having a counter portion facing the image density sensor across the intermediate transfer belt, edge positions of the counter portion in the width direction are inward, in the width direction, of edge positions of the stretching roller in the width direction or are same as the edge positions of the stretching roller in the width direction, the edge at one side of the stretching roller in the width direction is located inward, in the width direction, of the edge of the intermediate transfer belt at one side in the width direction and the edge at the other side of the stretching roller in the width direction is located inward, in the width direction, of the edge of the intermediate transfer belt at the other side in the width direction, and the image forming portion concurrently transfers the print image to the printing region and transfers the test pattern image to the test region.

2. The image forming apparatus according to claim 1, wherein the edge positions of the counter portion in the width direction are inward, in the width direction, of the edge positions of the stretching roller in the width direction but outward, in the width direction, of edge positions of the printing region in the width direction.

3. The image forming apparatus according to claim 2, wherein the image forming section transfers the test pattern image to a region of the test region overlapping with the counter portion.

4. The image forming apparatus according to claim 1, wherein parts of the intermediate transfer belt outward, in the width direction, of the edges of the stretching roller in the width direction are bent to an inner circumference side of the intermediate transfer belt.

5. The image forming apparatus according to claim 1, wherein the counter-sensor member includes:

a base member; and a sheet member that makes contact with the inner circumferential surface of the intermediate transfer belt by being disposed on a surface of the base member facing the inner circumferential surface of the intermediate transfer belt, and the sheet member has a lower friction coefficient than the base member against the inner circumferential surface of the intermediate transfer belt.

6. The image forming apparatus according to claim 5, wherein the sheet member is electrically conductive.

* * * * *